(12) United States Patent
Gotzig et al.

(10) Patent No.: US 11,053,892 B2
(45) Date of Patent: Jul. 6, 2021

(54) METHOD FOR OPERATING A ROCKET PROPULSION SYSTEM AND ROCKET PROPULSION SYSTEM

(71) Applicant: Airbus DS GmbH, Taufkirchen (DE)

(72) Inventors: Ulrich Gotzig, Bad Friedrichshall (DE); Malte Wurdak, Moeckmuehl (DE); Joel Deck, Neudenau (DE); Manuel Frey, Munich (DE)

(73) Assignee: ARIANEGROUP GMBH, Taufkirchen (DE)

( * ) Notice: Subject to any disclaimer, the term of this patent is extended or adjusted under 35 U.S.C. 154(b) by 799 days.

(21) Appl. No.: 15/598,473

(22) Filed: May 18, 2017

(65) Prior Publication Data

US 2017/0335797 A1    Nov. 23, 2017

(30) Foreign Application Priority Data

May 20, 2016   (DE) .................. 10 2016 208 729

(51) Int. Cl.
    *F02K 9/56*    (2006.01)
    *F02K 9/64*    (2006.01)
        (Continued)

(52) U.S. Cl.
    CPC ............... *F02K 9/56* (2013.01); *F02K 9/425* (2013.01); *F02K 9/58* (2013.01); *F02K 9/64* (2013.01);
        (Continued)

(58) Field of Classification Search
    CPC ..... F02K 9/44; F02K 9/46; F02K 9/56; F02K 9/563; F02K 9/58
    See application file for complete search history.

(56) References Cited

U.S. PATENT DOCUMENTS

| | | | | |
|---|---|---|---|---|
| 4,831,818 A | * | 5/1989 | Martin | ........ F02K 9/48 60/204 |
| 4,841,723 A | | 6/1989 | Lau et al. | |

(Continued)

FOREIGN PATENT DOCUMENTS

| | | |
|---|---|---|
| DE | 102009045704 | 4/2010 |
| EP | 2604839 | 6/2013 |
| RU | 2215891 C2 | 11/2003 |

OTHER PUBLICATIONS

German Search Report, dated Feb. 6, 2017, priority document.

(Continued)

*Primary Examiner* — Todd E Manahan
*Assistant Examiner* — Kyle Robert Thomas
(74) *Attorney, Agent, or Firm* — Greer, Burns & Crain, Ltd.

(57) ABSTRACT

A method for operating a rocket propulsion system comprises the steps of supplying oxygen to a combustion chamber, supplying hydrogen to the combustion chamber and combusting the oxygen-hydrogen mixture in the combustion chamber. The rocket propulsion system is operated alternately in a first operating mode, in which oxygen and hydrogen are supplied to the combustion chamber in a first mass mixing ratio of oxygen to hydrogen, and in a second operating mode, in which oxygen and hydrogen are supplied to the combustion chamber in a second mass mixing ratio of oxygen to hydrogen that is greater than the first mass mixing ratio.

16 Claims, 8 Drawing Sheets

(51) Int. Cl.
    *F02K 9/95*          (2006.01)
    *F02K 9/58*          (2006.01)
    *F02K 9/42*          (2006.01)

(52) U.S. Cl.
    CPC ............ *F02K 9/95* (2013.01); *F05D 2220/80* (2013.01); *F05D 2240/35* (2013.01); *F05D 2260/202* (2013.01); *F05D 2260/2212* (2013.01)

(56) References Cited

U.S. PATENT DOCUMENTS

| | | | | |
|---|---|---|---|---|
| 4,901,525 | A * | 2/1990 | Beveridge | F02K 9/48 102/350 |
| 5,063,734 | A | 11/1991 | Morris | |
| 5,857,323 | A * | 1/1999 | Beveridge | F02K 9/52 239/424.5 |
| 6,619,031 | B1 * | 9/2003 | Balepin | B64G 1/401 60/246 |
| 2008/0264035 | A1 * | 10/2008 | Ricciardo | F02K 9/64 60/267 |
| 2008/0264372 | A1 * | 10/2008 | Sisk | F02K 9/42 123/144 |
| 2012/0060464 | A1 | 3/2012 | Grote et al. | |

OTHER PUBLICATIONS

NASA Technical Memorandum 113157.
NASA Technical Memorandum 105249.
European Search Report, dated Oct. 12, 2017, priority document.
"Hydrogen/Oxygen Auxiliary propulsion Technology", Brian D. Reed et al., Sep. 4, 1991.
German Examination Report for corresponding German Patent Application No. 102016208730.4 dated Jul. 15, 2020, 6 pages.
R. Iacabucci et al., "Space Station Technology Summary" Jannaf Propulsion Meeting, vol. 1, Chemical Propulsion Information Agency, Laurel, MD, 1989, pp. 457-470.

* cited by examiner

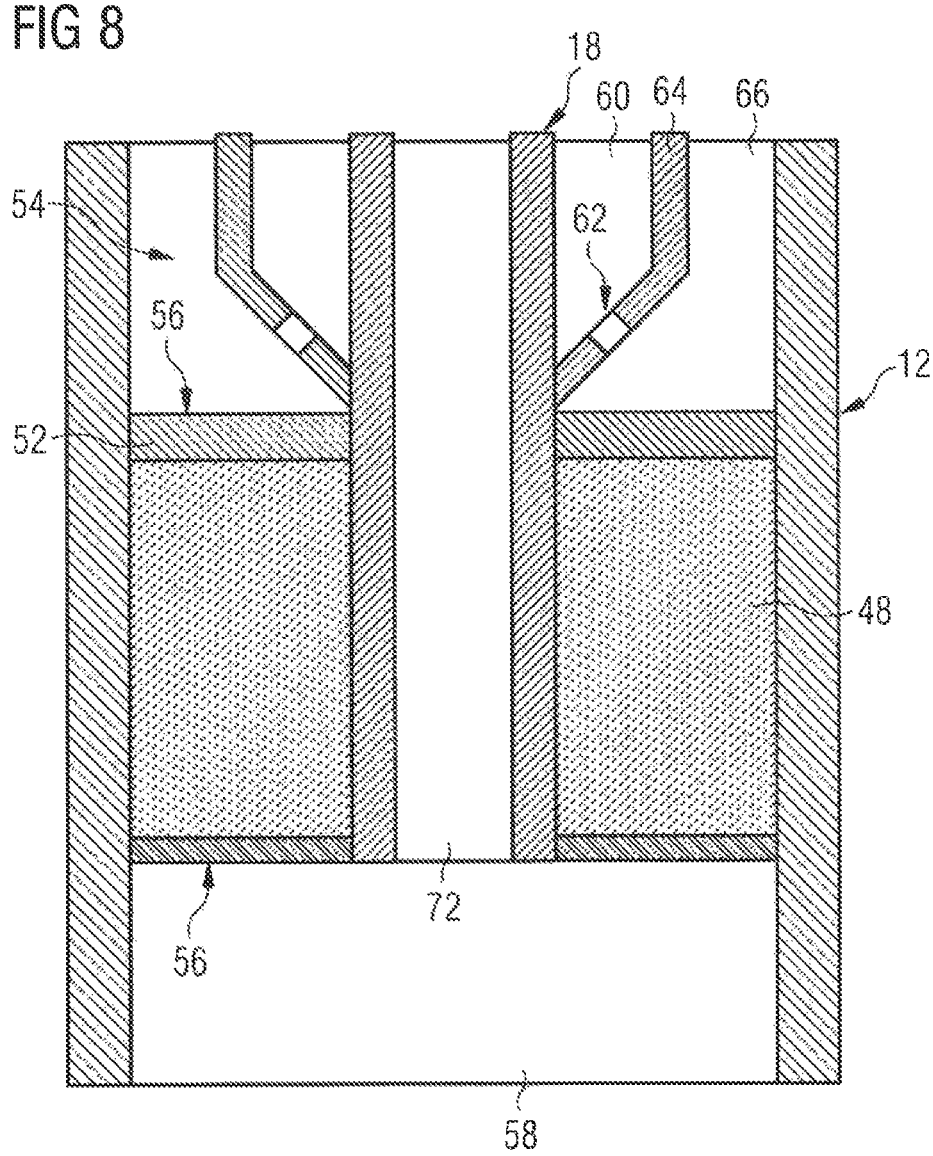

METHOD FOR OPERATING A ROCKET PROPULSION SYSTEM AND ROCKET PROPULSION SYSTEM

CROSS-REFERENCES TO RELATED APPLICATIONS

This application claims the benefit of the German patent application No. 10 2016 208 729.0 filed on May 20, 2016, the entire disclosures of which are incorporated herein by way of reference.

BACKGROUND OF THE INVENTION

The invention relates to a method for operating a rocket propulsion system and a rocket propulsion system.

Rocket engines operated using hydrogen characterize known propulsion systems for spacecraft. In rocket engines of this kind, hydrogen is burned with oxygen and thrust is generated thereby. These propulsion systems are used, for example, in the launch vehicles of the Ariane series, in which a rocket propulsion system operated using liquid hydrogen and liquid oxygen is formed as the main stage. The hydrogen and the oxygen are stored in hydrogen and oxygen tanks provided for this.

Furthermore, so-called water electrolysis propulsion systems are known, such as from the NASA Technical Memorandum 113157, for example, which can be used in satellites. In a water electrolysis propulsion system of this kind, water is split by electrolysis into hydrogen and oxygen. The hydrogen and oxygen thus produced are then burned in a combustion chamber of an engine to generate thrust. The water to be split by electrolysis can be stored at room temperature, while liquid hydrogen and liquid oxygen have to be stored in cryogenic conditions. This permits a reduced outlay on storage of the water over an entire mission time of several years.

By using hydrogen as fuel in rocket propulsion, a high energy yield and thus a high specific impulse of the rocket propulsion can be attained. However, the disadvantage of this high energy yield is that in the combustion of hydrogen, high combustion temperatures are reached, which in the case of stoichiometric combustion of hydrogen in particular leads to high thermal loading of the materials used in a rocket propulsion. This is a problem in water electrolysis propulsion systems in particular, as here hydrogen and oxygen are produced in a stoichiometric mixture ratio.

To limit the combustion temperatures in such systems, a sub-stoichiometric oxygen-hydrogen mixture is normally burned, such as disclosed in the NASA Technical Memorandum 105249, for example. Any remaining oxygen can then be used as cold gas and discharged to an environment of the water electrolysis propulsion system.

The efficiency to be achieved and the power of such rocket propulsion systems are substantially a function of the mixture ratio of oxygen to hydrogen of the oxygen-hydrogen mixture to be ignited in the combustion chamber.

SUMMARY OF THE INVENTION

An object of the invention is to provide a method for operating a rocket propulsion system and a rocket propulsion system, which facilitate an increase in power and a reliable operation of such rocket propulsion systems.

This object is achieved by a method for operating a rocket propulsion system with the features according to claim 1 and by a rocket propulsion system with the features according to claim 9.

A method for operating a rocket propulsion system comprises the steps of supplying oxygen and supplying hydrogen to a combustion chamber of the rocket propulsion system. In a further step of the method, the oxygen-hydrogen mixture is burned in the combustion chamber.

The rocket propulsion system is provided for using the oxygen-hydrogen mixture as a fuel mixture, which is burned in the combustion chamber to generate thrust. The combustion chamber can be connected to a thruster, to which exhaust gases produced in the combustion chamber by combustion of the oxygen-hydrogen mixture are supplied. The thruster can be provided to accelerate the exhaust gases produced in the combustion chamber on their exit from the combustion chamber as far as an exit opening of the thruster and then to discharge them to an environment of the rocket propulsion system at high exit velocities, in order thus to generate thrust.

The method provides that the rocket propulsion system is operated alternately in a first operating mode, in which oxygen and hydrogen are supplied to the combustion chamber in a first mass mixing ratio of oxygen to hydrogen, and in a second operating mode, in which oxygen and hydrogen are supplied to the combustion chamber in a second mass mixing ratio of oxygen to hydrogen that is greater than the first mass mixing ratio.

"Alternating operation" of the rocket propulsion system is understood here to mean an operation in which the rocket propulsion system is operated alternately and repeatedly in the first operating mode and in the second operating mode.

Due to the alternating operation of the rocket propulsion system in the first operating mode, in which oxygen and hydrogen are supplied to the combustion chamber in the first mass mixing ratio, and the second operating mode, in which oxygen and hydrogen are supplied to the combustion chamber in the second mass mixing ratio, an oxygen-hydrogen mixture can be supplied to the combustion chamber that has a higher proportion of oxygen as a whole in comparison to currently known methods. In particular, the method makes it possible to achieve stoichiometric combustion on average without thereby exceeding a permissible thermal loading of the materials used in the combustion chamber. The overall mass flow of gas emerging from the combustion chamber into the thruster and, in particular, the thrust and the power of the rocket propulsion system, can be increased by this.

In the first operating mode, the rocket propulsion system can be operated so that a first combustion temperature prevails in the combustion chamber due to the combustion of the oxygen-hydrogen mixture in the combustion chamber. The rocket propulsion system can accordingly be operated in the second operating mode so that a second combustion temperature prevails in the combustion chamber due to the combustion of the oxygen-hydrogen mixture in the combustion chamber. The rocket propulsion system can be operated in such a manner in this case that the first and the second combustion temperature are lower respectively than a permissible maximum material temperature of the materials used in the combustion chamber.

The first combustion temperature in the combustion chamber in the first operating mode can differ from the second combustion temperature in the combustion chamber in the second operating mode. In particular, the combustion temperature in the combustion chamber in the first operating mode can be greater than the second combustion temperature in the combustion chamber in the second operating mode. The second operating mode can contribute here to the cooling of the combustion chamber, so that the temperature of the materials installed in the combustion chamber does not exceed the permitted maximum material temperature during the operation of the rocket propulsion system. In the first operating mode, the oxygen-hydrogen mixture can thus be burned with a mass mixing ratio of oxygen to hydrogen that is closer to a stoichiometric mass mixing ratio in comparison with a known rocket propulsion system. Alternatively, the first combustion temperature in the combustion chamber in the first operating mode can be lower than the second combustion temperature in the combustion chamber in the second operating mode.

The method proposed here for operating the rocket propulsion system makes it possible for higher combustion temperatures to be attained in the combustion chamber, at least in phases, without exceeding the permissible thermal loading of the materials used in the combustion chamber by this. An oxygen-hydrogen mixture with a higher mass mixing ratio of oxygen to hydrogen, in particular with a mass mixing ratio that is closer to a stoichiometric mass mixing ratio, can be burned accordingly, at least in phases, and so a higher power of the rocket propulsion system can be attained.

In the method for operating the rocket propulsion system, the first mass mixing ratio can be a sub-stoichiometric mass mixing ratio of oxygen to hydrogen, in particular a mass mixing ratio of less than or equal to 2. The second mass mixing ratio can be a super-stoichiometric mass mixing ratio of oxygen to hydrogen, in particular a mass mixing ratio of greater than or equal to 50.

To conduct oxygen and hydrogen into the combustion chamber in the first operating mode in the first mass mixing ratio and in the second operating mode in the second mass mixing ratio, a first hydrogen mass flow can be supplied to the combustion chamber in the first operating mode of the rocket propulsion system, which flow is greater than a second hydrogen mass flow that is supplied to the combustion chamber in the second operating mode of the rocket propulsion system. In particular, the supply of hydrogen to the combustion chamber can be interrupted in the second operating mode of the rocket propulsion system.

Alternatively or in addition, in the first operating mode of the rocket propulsion system, a first oxygen mass flow can be supplied to the combustion chamber that is smaller than a second oxygen mass flow which is supplied to the combustion chamber in the second operating mode of the rocket propulsion system.

In a further development of the method, a portion of the oxygen supplied to the combustion chamber, and at least a portion of the hydrogen supplied to the combustion chamber, can be conducted into a catalyst chamber and the combustion of the oxygen-hydrogen mixture initiated in the catalyst chamber.

The catalyst chamber is preferably configured to initiate combustion of the hydrogen-oxygen mixture introduced into the catalyst chamber by means of a catalyst. In other words, the catalyst chamber can form a flow section of an oxygen-hydrogen mixture formed from at least a portion of the hydrogen conducted into the combustion chamber and at least a portion of the oxygen conducted into the combustion chamber, in which section the activation energy for initiating the combustion of the oxygen-hydrogen mixture supplied to the catalyst chamber is reduced by a catalyst, so that the oxygen-hydrogen mixture flowing through the catalyst chamber is ignited. The use of a catalyst chamber has the effect of a stable ignition of the oxygen-hydrogen mixture conducted into the combustion chamber.

The method can be provided for the at least one portion of the hydrogen conducted into the combustion chamber and the at least one portion of the oxygen conducted into the combustion chamber to be conducted into the catalyst chamber in such a way that in the first and/or the second operating mode of the rocket propulsion system, the oxygen-hydrogen mixture supplied to the catalyst chamber has a mass mixing ratio of oxygen to hydrogen that is sub-stoichiometric and, in particular, less than or equal to 2. By having an oxygen-hydrogen mixture flowing through the catalyst chamber in the first and/or the second operating mode of the rocket propulsion system that can have a sub-stoichiometric mass mixing ratio, in particular a mass mixing ratio of less than or equal to 2, the fatigue strength of the catalyst used in the catalyst chamber can be increased.

In a further development, a flashback arrestor can be arranged in the region of an entrance area of the catalyst chamber, via which area hydrogen and oxygen are supplied to the catalyst chamber. The flashback arrestor can be configured to prevent an ignition upstream of the catalyst chamber of the oxygen-hydrogen mixture to be supplied to the catalyst chamber. The term "upstream" refers here to the direction of the gases flowing through the catalyst chamber.

The oxygen conducted into the catalyst chamber and the hydrogen conducted into the catalyst chamber can be premixed in a premixing chamber of the catalyst chamber prior to initiating the combustion of the oxygen-hydrogen mixture. In other words, the premixing chamber can be configured to mix the oxygen to be supplied to the catalyst chamber and the hydrogen to be supplied to the catalyst chamber with one another to produce the oxygen-hydrogen mixture to be introduced into the catalyst chamber. The premixing chamber can be arranged upstream of the entrance area to the catalyst chamber and in particular can open into the entrance area to the catalyst chamber. Furthermore, the premixing chamber can be formed in such a way that it has a flow cross section for the gases to be supplied to the catalyst chamber that becomes larger in the flow direction. The oxygen-hydrogen mixture flowing through the premixing chamber can thus be expanded and decelerated, which can lead to an improved mixing of the oxygen-hydrogen mixture.

Downstream of an exit area of the catalyst chamber, via which the exhaust gases produced in the catalytic combustion chamber can exit from the catalyst chamber, a combustion section can be provided in the combustion chamber. The term "downstream" refers here to the direction of the gases exiting the catalyst chamber. The gases emerging from the catalyst chamber, which can comprise unburned hydrogen in particular, can be supplied to the overall combustion section in the combustion chamber.

The method can further provide that oxygen is supplied to the catalyst chamber via an oxygen supply opening, which can be formed in a wall of the catalyst chamber facing an oxygen supply duct.

The oxygen supply duct can be provided for conducting the oxygen supplied to the combustion chamber inside the combustion chamber and, in particular, for supplying at least a portion of the oxygen supplied to the combustion chamber to the catalyst chamber, in particular the premixing chamber of the catalyst chamber, and/or to the combustion section in the combustion chamber.

The hydrogen to be supplied to the catalyst chamber can be supplied to the catalyst chamber via a hydrogen supply duct. The hydrogen supply duct can be provided for conducting the hydrogen supplied to the combustion chamber inside the combustion chamber and, in particular, for supplying at least a portion of the hydrogen supplied to the combustion chamber to the catalyst chamber, in particular the premixing chamber of the catalyst chamber, and/or to the combustion section in the combustion chamber. To supply the catalyst chamber with the hydrogen that is to be supplied to the catalyst chamber, the hydrogen supply duct can open into the catalyst chamber. Alternatively, the hydrogen that is to be supplied to the catalyst chamber can be supplied to the catalyst chamber via a hydrogen supply opening, which can be formed in a wall of the catalyst chamber facing the hydrogen supply duct. The oxygen supply opening and/or the hydrogen supply opening are/is preferably formed in a region of the entrance area of the catalyst chamber, in particular in the wall of the catalyst chamber.

In a further development, the wall of the catalyst chamber can form the premixing chamber and/or the hydrogen supply duct. Furthermore, the oxygen supply duct can be formed, at least in sections, between an inner surface of the combustion chamber and an outer surface of the wall of the catalyst chamber. Alternatively the wall of the catalyst chamber can form the premixing chamber and/or the oxygen supply duct. Furthermore, the hydrogen supply duct can be formed, at least in sections, between the inner surface of the combustion chamber and the outer surface of the wall of the catalyst chamber.

The catalyst chamber can further be enclosed, at least in sections, by a cooling duct arranged between an outer surface of the catalyst chamber and the inner surface of the combustion chamber. The cooling duct can open into the combustion section of the combustion chamber arranged downstream of the exit area of the catalyst chamber. Oxygen supplied to the combustion chamber can be supplied to the combustion section via the cooling duct. In other words, the cooling duct can be configured so that oxygen supplied to the combustion chamber flows through it. The cooling duct can be connected accordingly to the oxygen supply duct, wherein the oxygen supply duct can open in particular into the cooling duct.

The method for operating the rocket propulsion system can be configured to vary an oxygen mass flow flowing through the cooling duct in the first operating mode and in the second operating mode of the rocket propulsion system. In particular, the method can be configured so that oxygen flows through the cooling duct only in the second operating mode of the rocket propulsion system. To this end the cooling duct can be not connected to the oxygen supply duct. In other words, the cooling duct can be separate from the oxygen supply duct. In particular, the method for operating the rocket propulsion system can be configured so that in the first operating mode, in which oxygen and hydrogen are supplied to the combustion chamber in the first mass mixing ratio, the oxygen supplied to the combustion chamber is supplied completely to the catalyst chamber, and in the second operating mode, in which oxygen and hydrogen are supplied to the combustion chamber in the second mass mixing ratio, oxygen is supplied additionally to the combustion section via the cooling duct. The oxygen supplied to the combustion section via the cooling duct in the second operating mode can be burned with the oxygen-hydrogen mixture emerging from the catalyst chamber. The method for operating the rocket propulsion system can further be configured so that an oxygen mass flow supplied to the catalyst chamber via the oxygen supply duct in the first operating mode and in the second operating mode of the rocket propulsion system is kept constant or is varied.

Alternatively, hydrogen supplied to the combustion chamber can be supplied to the combustion section via the cooling duct. The cooling duct can be configured accordingly so that hydrogen supplied to the combustion chamber flows through it. The cooling duct can be connected in this case to the hydrogen supply duct, wherein the hydrogen supply duct opens in particular into the cooling duct. Alternatively the cooling duct can be not connected to the hydrogen supply duct and can therefore be separate from this.

The cooling duct can be configured to conduct the gases flowing through the cooling duct along the outer surface of the catalyst chamber, in particular the outer surface of the wall of the catalyst chamber. This has the effect that gases flowing along the outer surface of the catalyst chamber, in particular oxygen or hydrogen flowing through the cooling duct, are heated and can thus cool the catalyst chamber.

In a further development, a swirl generation means, in particular a swirler, can be provided in the cooling duct. Alternatively the swirl generation means can be provided in the form of tangentially positioned holes provided in the cooling duct. By using the swirl generation means arranged in the cooling duct, the dwell time in the cooling duct of the gases flowing through the cooling duct can be increased. Thus the cooling function provided by the gases flowing through the cooling duct can be improved.

Alternatively or in addition, a core duct can pass through the catalyst chamber, at least in sections. The core duct can open into the combustion section of the combustion chamber arranged downstream of the exit area of the catalyst chamber. Oxygen supplied to the combustion chamber can be supplied to the combustion section via the core duct. In other words, the core duct can be configured so that oxygen supplied to the combustion chamber flows through it. The core duct can accordingly be connected to the oxygen supply duct, wherein the oxygen supply duct can, in particular, open into the core duct.

The method for operating the rocket propulsion system can be configured so that an oxygen mass flow flowing through the core duct can be varied in the first operating mode and in the second operating mode of the rocket propulsion system. In particular, the method can be configured so that oxygen flows through the core duct only in the second operating mode of the rocket propulsion system. To this end the core duct can be not connected to the oxygen supply duct and can therefore be separate from this. In particular, the method for operating the rocket propulsion system can be configured so that in the first operating mode, in which oxygen and hydrogen are supplied to the combustion chamber in the first mass mixing ratio, the oxygen supplied to the combustion chamber is supplied completely to the catalyst chamber, and in the second operating mode, in which oxygen and hydrogen are supplied to the combustion chamber in the second mass mixing ratio, oxygen is supplied additionally to the combustion section via the core duct. The oxygen supplied to the combustion section via the core duct in the second operating mode can be burned with the oxygen-hydrogen mixture emerging from the catalyst chamber. The method for operating the rocket propulsion system can further be configured in such a way that an oxygen mass flow supplied to the catalyst chamber via the oxygen supply duct in the first operating mode and in the second operating mode of the rocket propulsion system is kept constant or is varied.

Alternatively, hydrogen supplied to the combustion chamber can be supplied to the combustion section via the core duct. The core duct can be configured accordingly so that hydrogen supplied to the combustion chamber flows through it. The core duct can be connected in this case to the hydrogen supply duct, wherein the hydrogen supply duct opens, in particular, into the core duct. Alternatively, the cooling duct can be not connected to the hydrogen supply duct and can therefore be separate from this.

The core duct can be configured to conduct the gases flowing through the core duct along an inner wall of the catalyst chamber, in particular an outer surface of the inner wall of the catalyst chamber. This has the effect that gases flowing along the inner wall of the catalyst chamber, in particular oxygen or hydrogen flowing through the core duct, are heated and can thus cool the catalyst chamber.

A rocket propulsion system comprises a combustion chamber, an oxygen supply system, which is configured to supply oxygen to the combustion chamber, and a hydrogen supply system, which is configured to supply hydrogen to the combustion chamber. An ignition system of the rocket propulsion system is configured to initiate combustion of the oxygen-hydrogen mixture in the combustion chamber. The rocket propulsion system further comprises a control unit, which is configured to control the oxygen supply system and the hydrogen supply system so that the rocket propulsion system is operated alternately in a first operating mode, in which oxygen and hydrogen are supplied to the combustion chamber in a first mass mixing ratio of oxygen to hydrogen, and in a second operating mode, in which oxygen and hydrogen are supplied to the combustion chamber in a second mass mixing ratio of oxygen to hydrogen, which is greater than the first mass mixing ratio.

The first mass mixing ratio can be a sub-stoichiometric mass mixing ratio of oxygen to hydrogen, in particular a mass mixing ratio of less than or equal to 2. The second mass mixing ratio can be a super-stoichiometric mass mixing ratio of oxygen to hydrogen, in particular, a mass mixing ratio of greater than or equal to 50.

In a further development, the control unit can be configured to control the oxygen supply system and the hydrogen supply system so that in the first operating mode of the rocket propulsion system, a first hydrogen mass flow is supplied to the combustion chamber that is greater than a second hydrogen mass flow that is supplied to the combustion chamber in the second operating mode of the rocket propulsion system. In particular, the control unit can be configured to control the oxygen supply system and the hydrogen supply system so that in the second operating mode of the rocket propulsion system, the supply of hydrogen to the combustion chamber is interrupted.

Alternatively or in addition, the control unit can be configured to control the oxygen supply system and the hydrogen supply system so that in the first operating mode of the rocket propulsion system, a first oxygen mass flow is supplied to the combustion chamber that is smaller than a second oxygen mass flow that is supplied to the combustion chamber in the second operating mode of the rocket propulsion system.

The oxygen supply system can comprise an oxygen supply line, which is connected to the combustion chamber and through which oxygen to be supplied to the combustion chamber can flow. The oxygen supply system can further comprise an oxygen storage facility connected to the oxygen supply line to store oxygen. The oxygen supply line can be configured to supply oxygen from the oxygen storage facility to the combustion chamber. An oxygen supply valve connected to the control unit can be provided in the oxygen supply line. The control unit can be configured to control the oxygen mass flow to be supplied to the combustion chamber via the oxygen supply valve.

The hydrogen supply system can correspondingly comprise a hydrogen supply line, which is connected to the combustion chamber and through which hydrogen to be supplied to the combustion chamber can flow. The hydrogen supply system can further comprise a hydrogen storage facility to store hydrogen. The hydrogen supply line can be configured to supply hydrogen from the hydrogen storage facility to the combustion chamber. A hydrogen supply valve connected to the control unit can be provided in the hydrogen supply line. The control unit can be configured to control the hydrogen mass flow to be supplied to the combustion chamber via the hydrogen supply valve.

In a further development, the oxygen supply system and the hydrogen supply system can be connected to an electrolysis unit, which can be configured to split water supplied to the electrolysis unit via a water line from a water storage facility into hydrogen and oxygen by electrolysis. The oxygen produced in the electrolysis unit can be supplied via an oxygen line to the oxygen supply system, in particular to the oxygen storage facility of the oxygen supply system. The hydrogen produced in the electrolysis unit can correspondingly be supplied via a hydrogen line to the hydrogen supply system, in particular to the hydrogen storage facility of the hydrogen supply system.

The ignition system of the rocket propulsion system is configured to initiate the combustion of the oxygen-hydrogen mixture supplied to the combustion chamber. The ignition system can be provided in the form of a catalyst chamber arranged in the combustion chamber.

The control system can be configured to control the oxygen supply system, the hydrogen supply system and the ignition system so that at least a portion of the oxygen supplied to the combustion chamber and at least a portion of the hydrogen supplied to the combustion chamber are conducted into the catalyst chamber and the combustion of the oxygen-hydrogen mixture is initiated in the catalyst chamber.

The catalyst chamber can be provided in such a way that in the region of an entrance area, via which hydrogen and oxygen can be supplied to the catalyst chamber, a flashback arrestor can be arranged. The catalyst chamber can further comprise a premixing chamber for premixing the oxygen conducted into the catalyst chamber and the hydrogen conducted into the catalyst chamber prior to initiating combustion of the oxygen-hydrogen mixture.

So that oxygen can be supplied to the catalyst chamber, an oxygen supply opening to supply oxygen to the catalyst chamber can be formed in a wall of the catalyst chamber facing an oxygen supply duct.

The rocket propulsion system can further comprise a hydrogen supply duct arranged in the combustion chamber to supply hydrogen to the catalyst chamber. The hydrogen supply duct can open, in particular, into the catalyst chamber. Alternatively, a hydrogen supply opening to supply hydrogen to the catalyst chamber can be formed in a wall of the catalyst chamber facing the hydrogen supply duct.

In a further development, the catalyst chamber can be enclosed, at least in sections, by a cooling duct arranged between an outer surface of the catalyst chamber and an inner surface of the combustion chamber. The cooling duct can open into a combustion section of the combustion chamber arranged downstream of an exit area of the catalyst chamber. The control unit can be configured to control the oxygen supply system or the hydrogen supply system so that oxygen supplied to the combustion chamber or hydrogen supplied to the combustion chamber flows through the cooling duct. In particular, the control unit can be configured to control the oxygen supply system so that oxygen flows through the cooling duct only in the second operating mode of the rocket propulsion system.

A swirl generation means, in particular a swirler, can further be provided in the cooling duct. Alternatively the swirl generation means can be provided in the form of tangentially positioned holes provided in the cooling duct. The swirl generation means can be configured to induce swirl in the gases flowing through the cooling duct and thus increase the dwell time in the cooling duct of the gases flowing through the cooling duct.

Alternatively or in addition, a core duct can pass through the catalyst chamber, at least in sections. The control unit can be configured to control the oxygen supply system so that oxygen flows through the core duct only in the second operating mode of the rocket propulsion system.

BRIEF DESCRIPTION OF THE DRAWINGS

Preferred embodiments of the invention are explained in greater detail below with reference to the enclosed schematic drawings, wherein FIG. 8 shows an enlarged longitudinal section of the combustion chamber shown in FIG. 8 of the rocket propulsion system of a fifth embodiment.

DETAILED DESCRIPTION OF THE PREFERRED EMBODIMENTS

Figure 1:
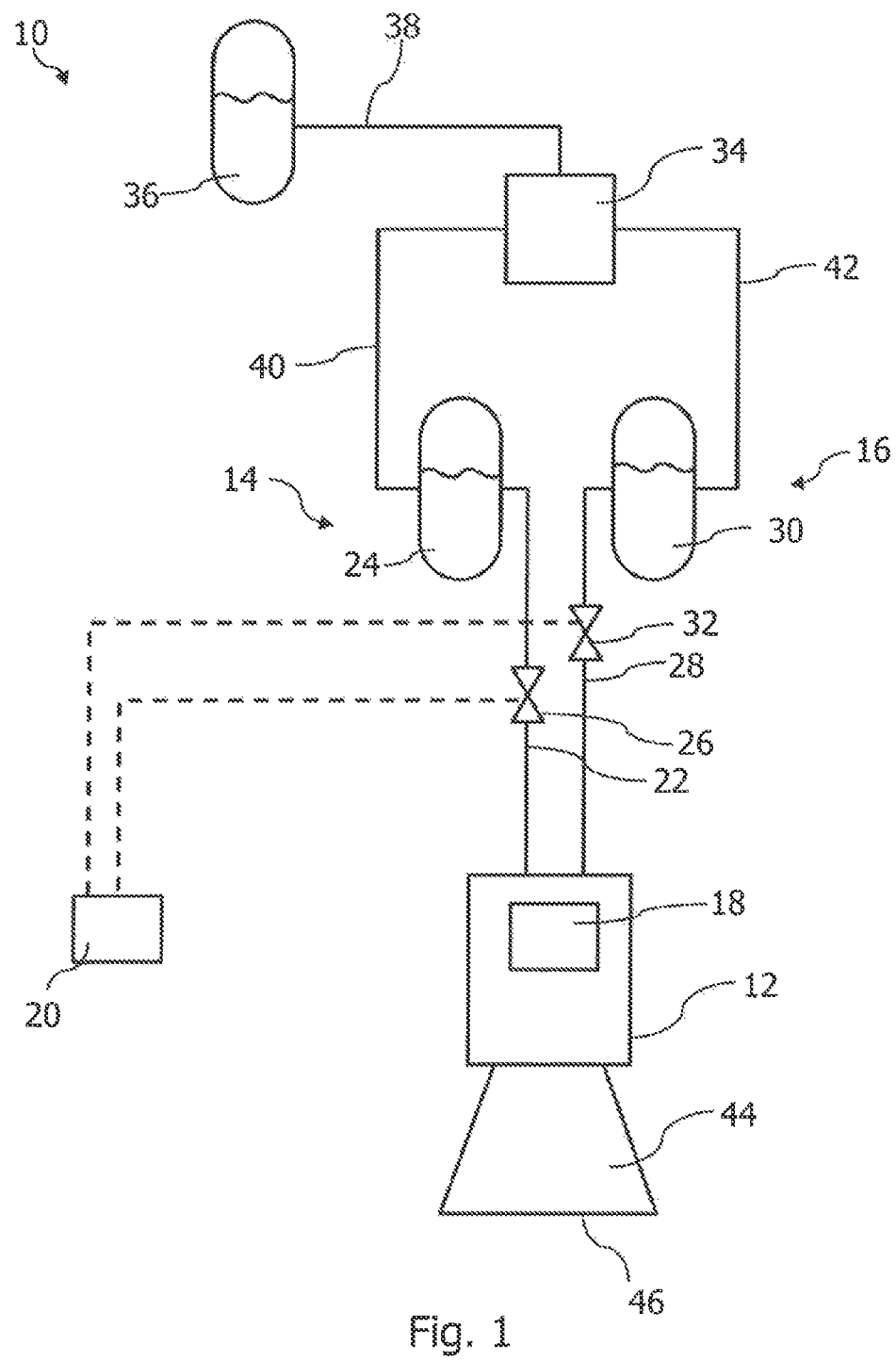
FIG. 1 shows a schematic view of a rocket propulsion system.

FIG. 1 shows a rocket propulsion system 10, which comprises a combustion chamber 12, an oxygen supply system 14 connected to the combustion chamber 12 and a hydrogen supply system 16 connected to the combustion chamber. The oxygen supply system 14 is configured to supply oxygen to the combustion chamber 12. Correspondingly the hydrogen supply system 16 is configured to supply hydrogen to the combustion chamber 12. An ignition system 18 of the rocket propulsion system 10 is configured to initiate combustion of the oxygen-hydrogen mixture in the combustion chamber 12.

The rocket propulsion system 10 further comprises a control unit 20, which is configured to control the oxygen supply system 14 and the hydrogen supply system 16 so that the rocket propulsion system 10 is operated alternately in a first operating mode, in which oxygen and hydrogen are supplied to the combustion chamber 12 in a first mass mixing ratio of oxygen to hydrogen, and in a second operating mode, in which oxygen and hydrogen are supplied to the combustion chamber 12 in a second mass mixing ratio of oxygen to hydrogen, which is greater than the first mass mixing ratio.

The oxygen supply system 14 comprises an oxygen supply line 22 connected to the combustion chamber 12, through which oxygen to be supplied to the combustion chamber 12 can flow. The oxygen supply line 22 is connected to an oxygen storage facility 24 of the oxygen supply system 14 for storing oxygen and is configured to supply oxygen from the oxygen storage facility 24 to the combustion chamber 12. An oxygen supply valve 26 connected to the control unit 20 is provided in the oxygen supply line 22, wherein an oxygen mass flow to be supplied to the combustion chamber 12 can be adjusted by means of the oxygen supply valve 26. The control unit 20 is configured to control the oxygen mass flow to be supplied to the combustion chamber 12 via the oxygen supply valve 26.

The hydrogen supply system 16 comprises a hydrogen supply line 28 connected to the combustion chamber 12, through which hydrogen to be supplied to the combustion chamber 12 can flow. The hydrogen supply line 28 is connected to a hydrogen storage facility 30 of the hydrogen supply system 16 for storing hydrogen and is configured to supply hydrogen from the hydrogen storage facility 30 to the combustion chamber 12. A hydrogen supply valve 32 connected to the control unit 20 is provided in the hydrogen supply line 28, by means of which a hydrogen mass flow to be supplied to the combustion chamber 12 via the hydrogen supply line 28 can be adjusted. The control unit 20 is configured to control the hydrogen mass flow to be supplied to the combustion chamber 12 via the hydrogen supply valve 32.

The oxygen supply system 14 and the hydrogen supply system 16 are connected to an electrolysis unit 34. The electrolysis unit 34 is configured to split water supplied to the electrolysis unit 34 from a water storage facility 36 via a water line 38 into hydrogen and oxygen by electrolysis. A water supply valve connected to the control unit 20 can further be provided in the water line, wherein a water mass flow to be supplied to the electrolysis unit 34 can be adjusted by means of the water supply valve. A non-return valve can also be arranged upstream of the water supply valve, i.e., opposite to the supply direction of the water. The oxygen produced in the electrolysis unit 34 can be supplied to the oxygen storage facility 24 via an oxygen line 40. The hydrogen produced in the electrolysis unit 34 can correspondingly be supplied via a hydrogen line 42 to the hydrogen storage facility 30. A non-return valve can also be provided in the oxygen line 40 and in the hydrogen line 42 respectively.

The combustion chamber 12 of the rocket propulsion system 10 is connected to a thruster 44, to which exhaust gases arising in the combustion chamber 12 due to combustion of the oxygen-hydrogen mixture can be supplied. The thruster 44 is provided to accelerate the exhaust gases produced in the combustion chamber 12 on their exit from the combustion chamber 12 up to an exit opening 46 of the thruster 44 and thereupon to discharge them to an environment of the rocket propulsion system 10 at high exit velocities, in order to generate thrust.

The control unit 20 is preferably configured to control the oxygen supply system 14 and the hydrogen supply system 16 so that the combustion chamber 12 of the rocket propulsion system 10 is supplied in the first operating mode with oxygen and hydrogen in the first mass mixing ratio, wherein the first mass mixing ratio is a sub-stoichiometric mass mixing ratio of oxygen to hydrogen, in particular a mass mixing ratio of less than or equal to 2. In the second operating mode of the rocket propulsion system 10, the control unit 20 is preferably configured to control the oxygen supply system 14 and the hydrogen supply system 16 so that the combustion chamber 12 of the rocket propulsion system 10 is supplied with oxygen and hydrogen in the second mass mixing ratio, wherein the second mass mixing ratio is a super-stoichiometric mass mixing ratio of oxygen to hydrogen, in particular a mass mixing ratio of greater than or equal to 50.

In particular, the control unit 20 can be configured to control the oxygen supply system 14 and the hydrogen supply system 16 so that in the first operating mode of the rocket propulsion system 10, a first hydrogen mass flow is supplied to the combustion chamber 12, which is greater than a second hydrogen mass flow, which is supplied to the combustion chamber 12 in the second operating mode of the rocket propulsion system 10. In particular, the control unit 20 can be configured to control the oxygen supply system 14 and the hydrogen supply system 16 so that the supply of hydrogen to the combustion chamber 12 is interrupted in the second operating mode of the rocket propulsion system 10.

Alternatively or in addition, the control unit 20 can be configured to control the oxygen supply system 14 and the hydrogen supply system 16 so that in the first operating mode of the rocket propulsion system 10, a first oxygen mass flow is supplied to the combustion chamber 12, which is smaller than a second oxygen mass flow, which is supplied to the combustion chamber 12 in the second operating mode of the rocket propulsion system 10.

Figure 2:
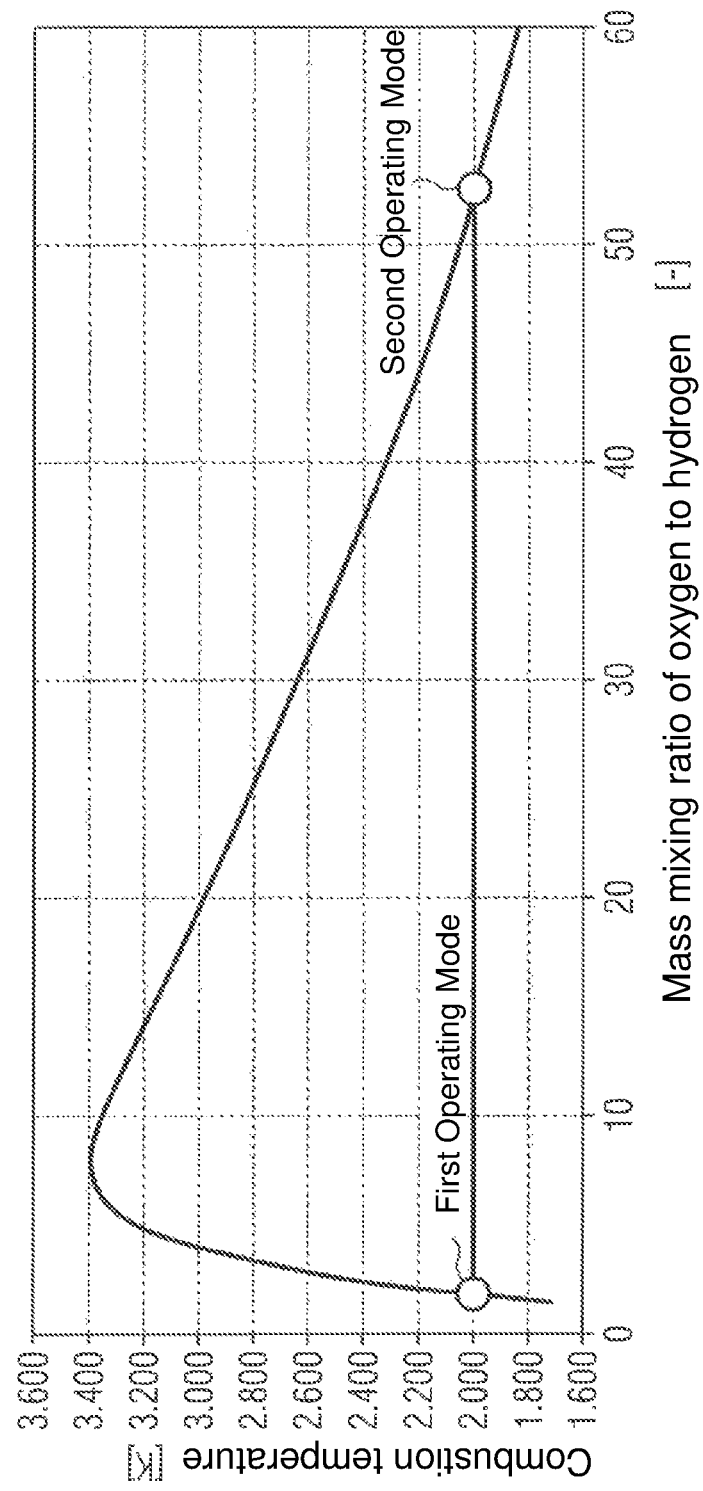
FIG. 2 shows a diagram that illustrates a connection between the combustion temperature in a combustion chamber and a mixing ratio of an oxygen-hydrogen mixture to be ignited in the combustion chamber.

FIG. 2 shows a diagram, which illustrates an exemplary operation of the rocket propulsion system 10 shown in FIG. 1 in the first operating mode and in the second operating mode of the rocket propulsion system 10. Here the combustion temperature in the combustion chamber 12 is shown as a function of the mass mixing ratio of oxygen to hydrogen of the oxygen-hydrogen mixture supplied to the combustion chamber 12. The abscissa of the diagram shows the mass mixing ratio of oxygen to hydrogen of the oxygen-hydrogen mixture supplied to the combustion chamber 12 and the ordinate of the diagram shows the combustion temperature in the combustion chamber 12 that arises due to combustion of the oxygen-hydrogen mixture supplied to the combustion chamber 12. As illustrated in FIG. 2, the combustion temperature in the combustion chamber 12 is at its highest during the combustion of a stoichiometric oxygen-hydrogen mixture, i.e., at a mass mixing ratio of oxygen to hydrogen of 8.

In the first operating mode of the rocket propulsion system 10, oxygen and hydrogen are supplied to the combustion chamber 12 in a mass mixing ratio of substantially 2. In the second operating mode of the rocket propulsion system 10, oxygen and hydrogen are supplied to the combustion chamber 12 in a mass mixing ratio of substantially 52. In the first and the second operating mode of the rocket propulsion system 10, the combustion temperature is 2000 K in each case.

Figure 3:
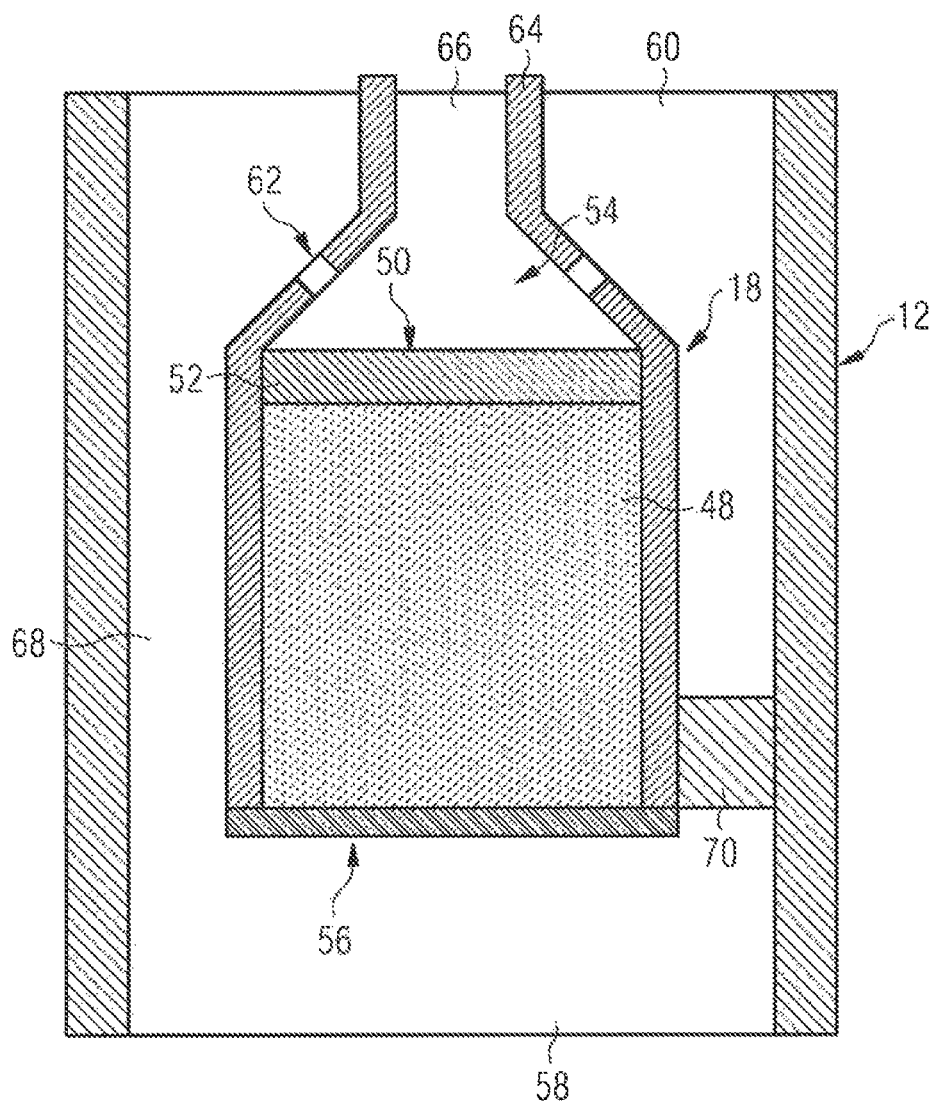
FIG. 3 shows an enlarged longitudinal section of a combustion chamber shown in FIG. 1 of the rocket propulsion system of a first embodiment.

FIG. 3 shows an enlarged longitudinal section of the combustion chamber 12 of the rocket propulsion system 10 shown in FIG. 1 with the ignition system 18 arranged therein. The ignition system 18 comprises a catalyst chamber 48 arranged in the combustion chamber 12, which catalyst chamber is configured to initiate the combustion of the oxygen-hydrogen mixture supplied to the combustion chamber 12. The control system 20 is configured to control the oxygen supply system 14, the hydrogen supply system 16 and the ignition system 18 so that at least a first portion of the oxygen supplied to the combustion chamber 12 and at least a portion of the hydrogen supplied to the combustion chamber 12 are conducted into the catalyst chamber 48 and the combustion of the oxygen-hydrogen mixture is initiated in the catalyst chamber 48. The catalyst chamber 48 has an entrance area 50, via which oxygen and hydrogen supplied to the combustion chamber 12 can be supplied to the catalyst chamber 48. In the region of the entrance area 50 of the catalyst chamber 48, a flashback arrestor 52 is arranged in the catalyst chamber 48, which arrestor is configured to prevent ignition upstream of the catalyst chamber 48 of the oxygen-hydrogen mixture to be supplied to the catalyst chamber 48.

Upstream of the flashback arrestor 52, the catalyst chamber 48 comprises a premixing chamber 54 for premixing the oxygen conducted into the catalyst chamber 48 and the hydrogen conducted into the catalyst chamber 48 prior to the initiation of combustion of the oxygen-hydrogen mixture. The premixing chamber 54 opens into the entrance area 50 to the catalyst chamber 48 and is arranged substantially perpendicular to this. A flow cross section of the premixing chamber 54 is formed so that it becomes larger in the direction of the entrance area 50 to the catalyst chamber 48, i.e., in the flow direction.

The catalyst chamber 48 further comprises an exit area 56, via which the exhaust gases produced in the catalyst chamber 48 are supplied to a combustion section 58 of the combustion chamber 12 arranged downstream of the exit area 56 of the catalyst chamber 48.

An oxygen supply duct 60 arranged in the combustion chamber 12 is configured to conduct at least the first portion of the oxygen supplied to the combustion chamber 12 into the premixing chamber 54 of the catalyst chamber 48 and a second portion of the oxygen supplied to the combustion chamber 12 into the combustion section 58 of the combustion chamber 12. To conduct the first portion of the oxygen supplied to the combustion chamber 12 into the premixing chamber 54 of the catalyst chamber 48, oxygen is supplied to the premixing chamber 54 of the catalyst chamber 48 via an oxygen supply opening 62, which is formed in a catalyst chamber wall 64 facing the oxygen supply duct 60.

Furthermore, a hydrogen supply duct 66 is arranged in the combustion chamber 12, via which the hydrogen supplied to the combustion chamber 12 is supplied to the catalyst chamber 48. The hydrogen supply duct 66 opens into the premixing chamber 54 of the catalyst chamber 48 and is arranged substantially perpendicular to the entrance area 50 of the catalyst chamber 48. In the embodiment of the rocket propulsion system 10 shown here, the hydrogen supply duct 66 has a circular cross section, wherein the hydrogen supply duct 66 passes through the oxygen supply duct 60. The oxygen supply duct 60 is formed accordingly in the form of an annular gap with an annular cross section.

The ignition system 18 of the rocket propulsion system 10 is formed so that the catalyst chamber wall 64 forms the catalyst chamber 48, the premixing chamber 54 and the hydrogen supply duct 66, wherein the oxygen supply duct 60 is arranged between an inner surface of the combustion chamber 12 and an outer surface of the catalyst chamber wall 64.

The catalyst chamber 48 is enclosed, at least in sections, by a cooling duct 68 arranged between an outer surface of the catalyst chamber 48 formed by the catalyst chamber wall 64 and the inner surface of the combustion chamber 12. The cooling duct 68 opens into the combustion section 58 of the combustion chamber 12 arranged downstream of the exit area 56 of the catalyst chamber 48 and the second portion of the oxygen supplied to the combustion chamber 12 flows through it. The oxygen supply duct 60 opens into the cooling duct 68.

Arranged in the cooling duct 68 is a swirl generation means in the form of a swirler 70, which is configured to induce swirl in the oxygen to be supplied to the combustion section 58 via the cooling duct 68. The dwell time in the cooling duct 68 of the oxygen flowing through the cooling duct 68 can thus be increased. Alternatively the swirl generation means can be provided in the form of tangentially positioned holes provided in the cooling duct 68.

Figure 4:
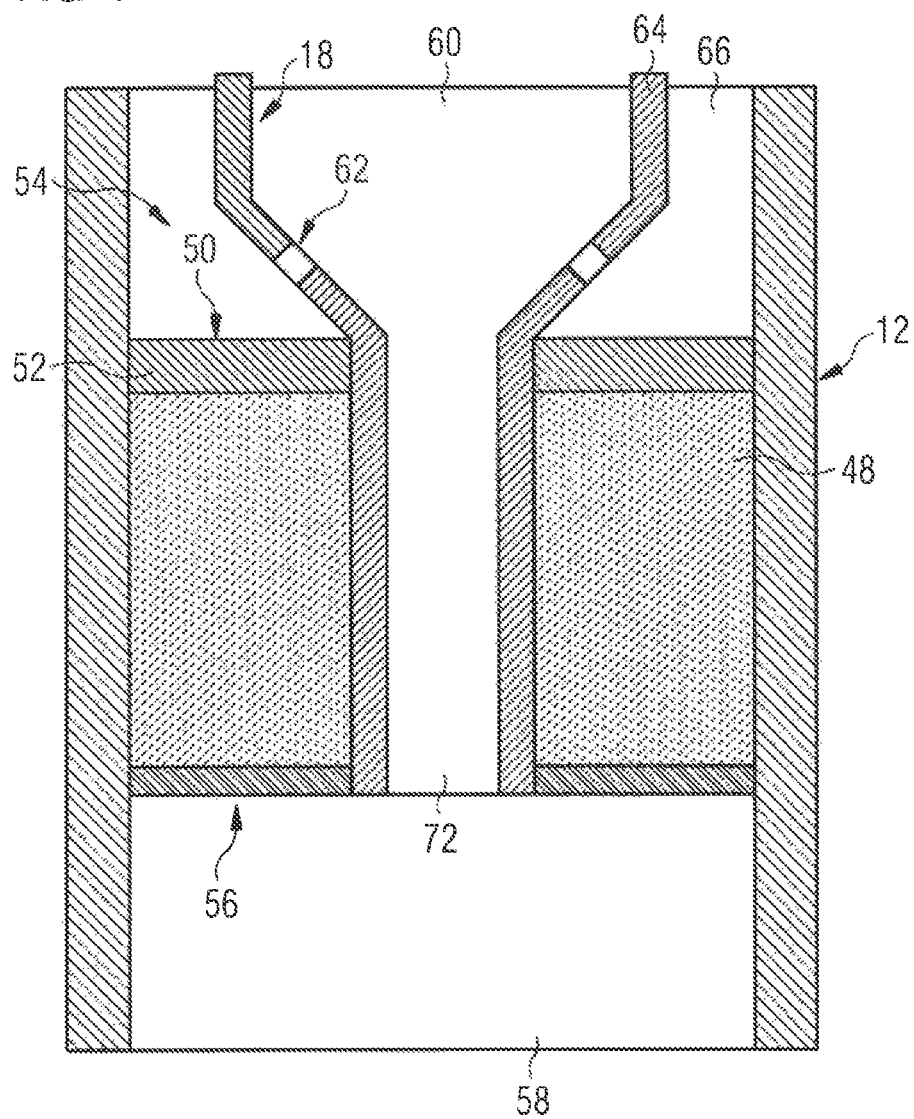
FIG. 4 shows an enlarged longitudinal section of the combustion chamber shown in FIG. 1 of the rocket propulsion system of a second embodiment.

A combustion chamber 12 of a second embodiment of the rocket propulsion system 10 is shown in FIG. 4. Compared with the embodiment shown in FIG. 3, an external outer surface of the catalyst chamber 48 adjoins the inner surface of the combustion chamber 12. Passing through the catalyst chamber 48, at least in sections, is a core duct 72, which opens into the combustion section 58 arranged downstream of the exit area 56 of the catalyst chamber 48. In the embodiment shown here, the oxygen supply duct 60 has a circular cross section, wherein the oxygen supply duct 60 passes through the hydrogen supply duct 66. The oxygen supply duct 60 opens into the core duct 72, wherein the second portion of the oxygen supplied to the combustion chamber 12 flows through the core duct 72 and is conducted by this into the combustion section 58 of the combustion chamber 12. The core duct 72 is configured to conduct the oxygen flowing through the core duct 72 along an internal outer surface of the catalyst chamber 48 formed by the catalyst chamber wall 64.

Figure 5:
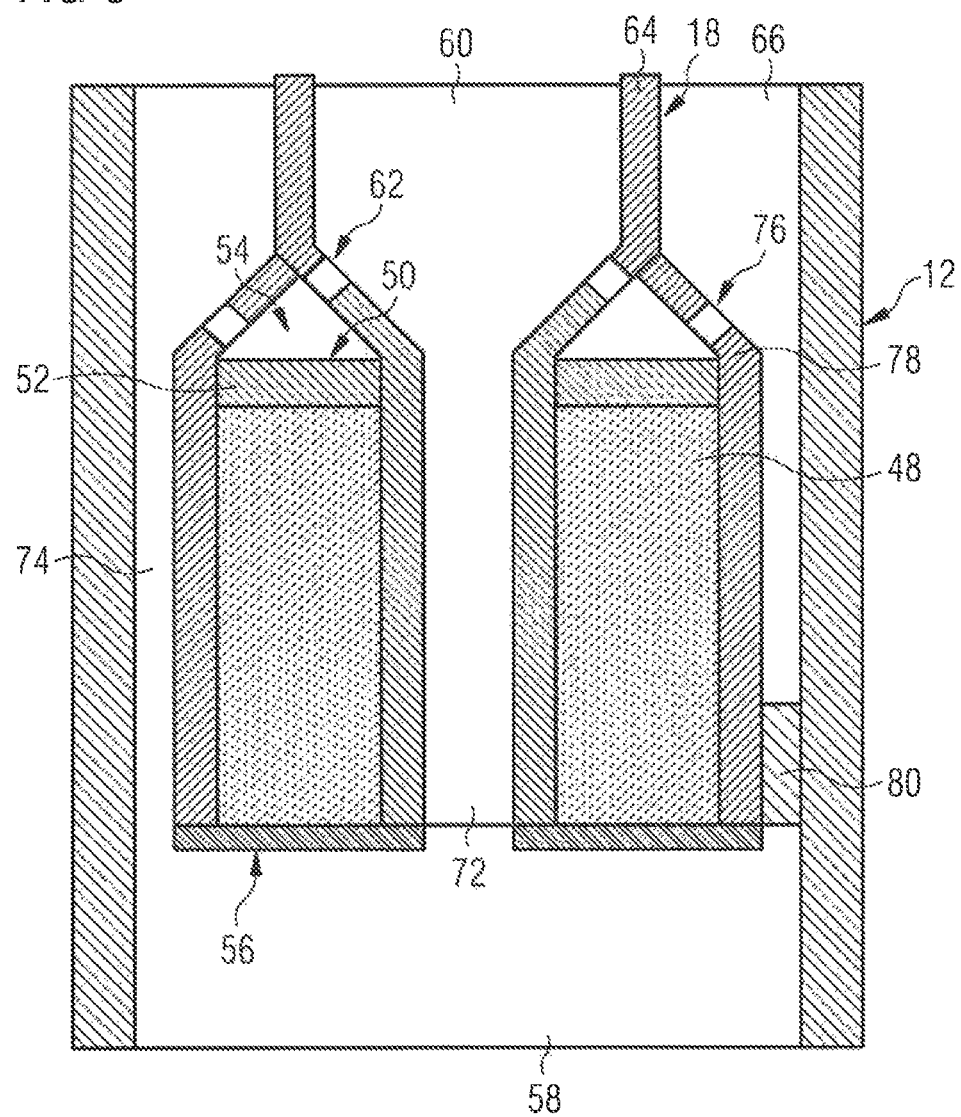
FIG. 5 shows an enlarged longitudinal section of the combustion chamber shown in FIG. 1 of the rocket propulsion system of a third embodiment.

FIG. 5 shows an enlarged longitudinal section of the combustion chamber 12 shown in FIG. 1 of a rocket propulsion system 10 of a third embodiment. Here the core duct 72, through which the second portion of the oxygen supplied to the combustion chamber 12 flows and which conducts this into the combustion section 58 of the combustion chamber 12, passes through the catalyst chamber 48.

In the embodiment shown here, the hydrogen supply duct 66 is configured to conduct at least a first portion of the hydrogen supplied to the combustion chamber 12 into the catalyst chamber 48 and to conduct a second portion of the hydrogen supplied to the combustion chamber 12 via a cooling duct 74 into the combustion section 58 of the combustion chamber 12. The first portion of the hydrogen supplied to the combustion chamber 12 is supplied to the premixing chamber 54 of the catalyst chamber 48 via a hydrogen supply opening 76, which is formed in another, outer catalyst chamber wall 78 facing the hydrogen supply duct 66.

The cooling duct 74, through which the second portion of the hydrogen supplied to the combustion chamber 12 can flow, is arranged between the external outer surface of the catalyst chamber 48 and the inner surface of the combustion chamber 12. The catalyst chamber 48 is enclosed, at least in sections, by the cooling duct 74. The cooling duct 74 is formed so that the hydrogen supplied to the combustion section 58 via the cooling duct 74 forms a reactive and low-oxidizer cooling film on the inner surface of the combustion chamber 12 in the combustion section 58 of the combustion chamber 12. This has the effect that reductive conditions can prevail along an inner surface of the combustion chamber 12 and thus a reaction of a combustion chamber wall with oxygen can be prevented. At the same time, lower combustion temperatures can be reached by this in the region of the combustion chamber wall in operation of the rocket propulsion system 10. Furthermore, the core duct 72 is formed so that the oxygen supplied to the combustion section 58 of the combustion chamber 12 via the core duct 72 forms an oxidizer-rich gas core with higher combustion temperatures in the combustion section 58 of the combustion chamber 12, which core is enclosed by the cooling film formed by the cooling duct 74. In other words, due to the cooling film enclosing the gas core, a thermal insulation can be provided between the gas core having high combustion temperatures and the combustion chamber wall. The thermal loading on the combustion chamber wall during the operation of the rocket propulsion system 10 can thus be reduced.

A swirl generation means in the form of a swirler 80 is arranged in the cooling duct 74 and is configured to induce swirl in the hydrogen to be supplied to the combustion section 58 via the cooling duct 74. Alternatively the swirl generation means can be provided in the form of tangentially positioned holes provided in the cooling duct 74.

Figure 6:
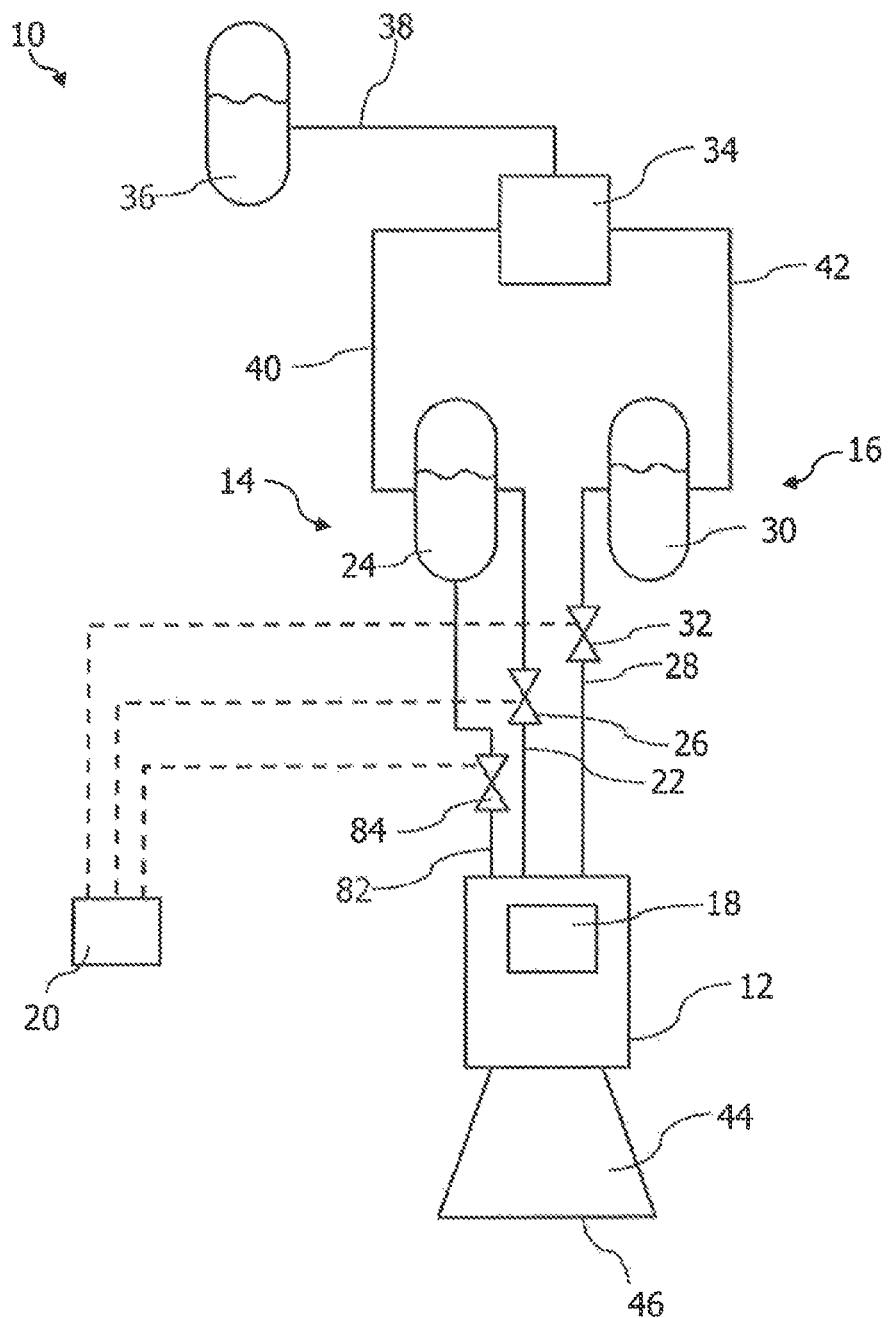
FIG. 6 shows a schematic view of a rocket propulsion system of a fourth embodiment.

A schematic view of a rocket propulsion system 10 of a fourth embodiment is shown in FIG. 6. The rocket propulsion system 10 shown in FIG. 6 differs from the embodiment shown in FIG. 1 in that the oxygen supply system 14 has a further oxygen supply line 82 connected to the combustion chamber 12. The further oxygen supply line 82 is configured to supply oxygen from the oxygen storage facility 24 to the combustion chamber 12. Provided in the further oxygen supply line 82 is a further oxygen supply valve 84 connected to the control unit 20, wherein a further oxygen mass flow to be supplied to the combustion chamber 12 can be adjusted via the further oxygen supply valve 84.

Figure 7:
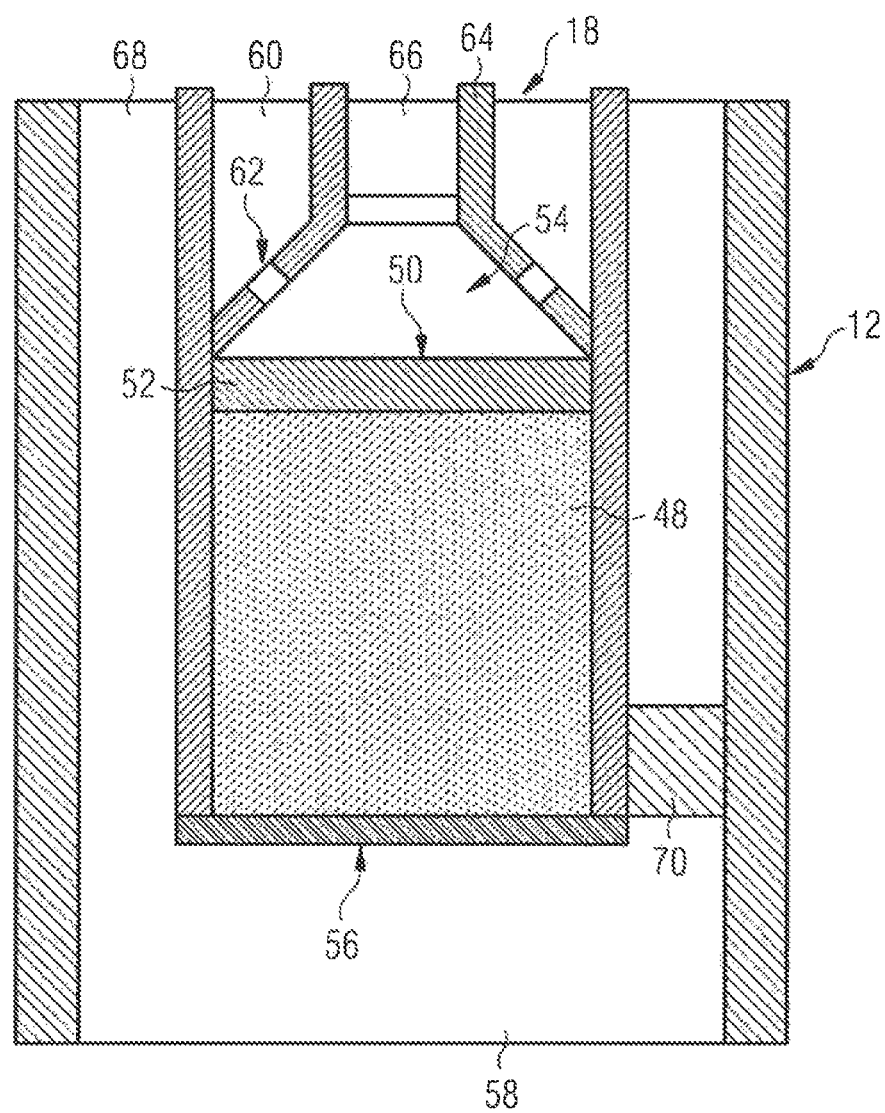
FIG. 7 shows an enlarged longitudinal section of a combustion chamber shown in FIG. 6 of the rocket propulsion system of the fourth embodiment.

FIG. 7 shows an enlarged longitudinal section of the combustion chamber 12 shown in FIG. 6. Compared with the embodiment of the rocket propulsion system 10 shown in FIG. 3, the oxygen supply duct 60 arranged in the combustion chamber 12 is not connected to the cooling duct 68 in the embodiment shown here. In other words, the oxygen supply duct 60 is separate from the cooling duct 68. The oxygen supply duct 60 is configured to supply the oxygen, which is supplied to the combustion chamber 12 by the oxygen supply line 22 of the oxygen supply system 14, to the catalyst chamber 48 via the oxygen supply opening 62 and the premixing chamber 54 of the catalyst chamber 48.

In the embodiment shown here, the cooling duct 68 is connected to the further oxygen supply line 82 of the oxygen supply system 14 and is configured to supply the oxygen, which is supplied to the combustion chamber 12 by the further oxygen supply line 82 of the oxygen supply system 14, to the combustion section 58 of the combustion chamber 12.

The control unit 20 is preferably configured in this case to control the oxygen supply system 14, the hydrogen supply system 16 and the ignition system 18 so that the oxygen mass flow flowing through the cooling duct 68 is varied in the first operating mode and the second operating mode of the rocket propulsion system 10. In particular, the control unit 20 can be configured to control the oxygen supply system 14, the hydrogen supply system 16 and the ignition system 18 so that oxygen flows through the cooling duct 68 only in the second operating mode of the rocket propulsion system 10.

FIG. 8 shows an enlarged longitudinal section of the combustion chamber 12 shown in FIG. 6 of the rocket propulsion system 10 of a fifth embodiment. Compared with the embodiment of the rocket propulsion system 10 shown in FIG. 4, the oxygen supply duct 60 arranged in the combustion chamber 12 is not connected to the core duct 72. In other words, the oxygen supply duct 60 is provided so that it is separate from the core duct 72. The oxygen supply duct 60 is configured to supply the oxygen, which is supplied to the combustion chamber 12 by the oxygen supply line 22 of the oxygen supply system 14, to the catalyst chamber 48 via the oxygen supply opening 62 and the premixing chamber 54 of the catalyst chamber 48.

In the embodiment shown here, the core duct 72 is connected to the further oxygen supply line 82 of the oxygen supply system 14 and is configured to supply the oxygen, which is supplied to the combustion chamber 12 by the further oxygen supply line 82, to the combustion section 58 of the combustion chamber 12.

The control unit 20 is preferably configured in this case to control the oxygen supply system 14, the hydrogen supply system 16 and the ignition system 18 so that the oxygen mass flow flowing through the core duct 72 is varied in the first operating mode and the second operating mode of the rocket propulsion system 10. In particular, the control unit 20 can be configured to control the oxygen supply system 14, the hydrogen supply system 16 and the ignition system 18 so that oxygen flows through the core duct 72 only in the second operating mode of the rocket propulsion system 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for operating a rocket propulsion system, which comprises:
    supplying oxygen to a combustion chamber,
    supplying hydrogen to the combustion chamber to form an oxygen-hydrogen mixture, and
    combusting the oxygen-hydrogen mixture in the combustion chamber,
    wherein the rocket propulsion system is operated alternately in a first operating mode, in which oxygen and hydrogen are supplied to the combustion chamber in a first mass mixing ratio of oxygen to hydrogen, and in a second operating mode, in which oxygen and hydrogen are supplied to the combustion chamber in a second mass mixing ratio of oxygen to hydrogen that is greater than the first mass mixing ratio, wherein the first mass mixing ratio is a sub-stoichiometric mass mixing ratio of oxygen to hydrogen, and wherein the second mass mixing ratio is a super-stoichiometric mass mixing ratio of oxygen to hydrogen,
    wherein at least a portion of the oxygen supplied to the combustion chamber and at least a portion of the hydrogen supplied to the combustion chamber are conducted into a catalyst chamber and the combustion of the oxygen-hydrogen mixture is initiated in the catalyst chamber,
    wherein the oxygen conducted into the catalyst chamber and the oxygen conducted into the catalyst chamber are premixed in a premixing chamber of the catalyst chamber prior to initiating the combustion of the oxygen-hydrogen mixture, and
    wherein oxygen is supplied to the premixing chamber via an oxygen supply opening, which is formed in a wall of the catalyst chamber facing an oxygen supply duct which extends along at least a portion of the wall of the catalyst chamber, and
    wherein in the first operating mode of the rocket propulsion system, a first hydrogen mass flow is supplied to the combustion chamber that is greater than a second hydrogen mass flow, which is supplied to the combustion chamber in the second operating mode of the rocket propulsion system.

2. The method according to claim 1, wherein the first mass mixing ratio is less than or equal to 2.

3. The method according to claim 1, wherein the second mass mixing ratio is equal to about 52.

4. The method according to claim 1, wherein the supply of hydrogen to the combustion chamber is interrupted in the second operating mode of the rocket propulsion system.

5. The method according to claim 1, wherein in the first operating mode of the rocket propulsion system, a first oxygen mass flow is supplied to the combustion chamber that is smaller than a second oxygen mass flow which is supplied to the combustion chamber in the second operating mode of the rocket propulsion system.

6. The method according to claim 1, wherein at least one of:
    a flashback arrestor is arranged in the region of an entrance area to the catalyst chamber; or
    hydrogen is supplied to the catalyst chamber via a hydrogen supply duct opening into the catalyst chamber or via a hydrogen supply opening which is formed in a wall of the catalyst chamber facing a hydrogen supply duct.

7. The method according to claim 6, wherein the catalyst chamber is enclosed, at least in sections, by a cooling duct arranged between an outer surface of the catalyst chamber and an inner surface of the combustion chamber, wherein the cooling duct opens into a combustion section of the combustion chamber arranged downstream of an exit area of the catalyst chamber and oxygen is supplied to the combustion chamber or hydrogen is supplied to the combustion chamber through the cooling duct, wherein at least one of:
    oxygen flows through the cooling duct only in the second operating mode of the rocket propulsion system; or
    a swirler is provided in the cooling duct.

8. The method according to claim 6, wherein a core duct passes through the catalyst chamber, at least in sections, through which duct oxygen flows only in the second operating mode of the rocket propulsion system.

9. A rocket propulsion system, comprising:
    a combustion chamber,
    an oxygen supply system configured to supply oxygen to the combustion chamber,
    a hydrogen supply system configured to supply hydrogen to the combustion chamber,
    a control unit configured to control the oxygen supply system and the hydrogen supply system so that the rocket propulsion system is operated alternately in a first operating mode, in which oxygen and hydrogen are supplied to the combustion chamber in a first mass mixing ratio of oxygen to hydrogen, and in a second operating mode, in which oxygen and hydrogen are supplied to the combustion chamber in a second mass mixing ratio of oxygen to hydrogen that is greater than the first mass mixing ratio,
    wherein the control unit is configured to control the oxygen supply system and the hydrogen supply system so that at least a portion of the oxygen supplied to the combustion chamber and at least a portion of the hydrogen supplied to the combustion chamber are conducted into a catalyst chamber and the combustion of the oxygen-hydrogen mixture is initiated in the catalyst chamber, wherein the catalyst chamber comprises a premixing chamber for premixing of the oxygen conducted into the catalyst chamber and the hydrogen conducted into the catalyst chamber prior to initiating the combustion of the oxygen-hydrogen mixture, wherein an oxygen supply opening for supplying oxygen to the catalyst chamber is formed in a wall of the catalyst chamber facing an oxygen supply duct which extends along at least a portion of the wall of the catalyst chamber, and wherein the control unit is configured to control the oxygen supply system and the hydrogen supply system so that in the first operating mode of the rocket propulsion system, a first hydrogen mass flow is supplied to the combustion chamber that is greater than a second hydrogen mass flow that is supplied to the combustion chamber in the second operating mode of the rocket propulsion system, and wherein the control unit is configured to control the oxygen supply system and the hydrogen supply system so that in the second operating mode of the rocket propulsion system, the supply of hydrogen to the combustion chamber is interrupted.

10. The rocket propulsion system according to claim 9, wherein the first mass mixing ratio is a sub-stoichiometric mass mixing ratio of oxygen to hydrogen and wherein the second mass mixing ratio is a super-stoichiometric mass mixing ratio of oxygen to hydrogen.

11. The rocket propulsion system according to claim 10, wherein the first mass mixing ratio is less than or equal to 2.

12. The rocket propulsion system according to claim 10, wherein the second mass mixing ratio is equal to about 52.

13. The rocket propulsion system according to claim 9, wherein the control unit is configured to control the oxygen supply system and the hydrogen supply system so that in the first operating mode of the rocket propulsion system, a first oxygen mass flow is supplied to the combustion chamber that is smaller than a second oxygen mass flow that is supplied to the combustion chamber in the second operating mode of the rocket propulsion system.

14. The rocket propulsion system according to claim 9, wherein at least one of:
a flashback arrestor is arranged in the region of an entrance area to the catalyst chamber; or
a hydrogen supply duct for supplying hydrogen to the catalyst chamber opens into the catalyst chamber or a hydrogen supply opening for supplying hydrogen to the catalyst chamber is formed in a wall of the catalyst chamber facing a hydrogen supply duct.

15. The rocket propulsion system according to claim 14, wherein the catalyst chamber is enclosed, at least in sections, by a cooling duct arranged between an outer surface of the catalyst chamber and an inner surface of the combustion chamber, wherein the cooling duct opens into a combustion section of the combustion chamber arranged downstream of an exit area of the catalyst chamber and the control unit is configured to control the oxygen supply system or the hydrogen supply system so that oxygen supplied to the combustion chamber or hydrogen supplied to the combustion chamber flows through the cooling duct, and at least one of:
the control unit is configured to control the oxygen supply system so that oxygen flows through the cooling duct only in the second operating mode of the rocket propulsion system; or
a swirler is provided in the cooling duct.

16. The rocket propulsion system according to claim 14, wherein a core duct passes through the catalyst chamber, at least in sections, and the control unit is configured to control the oxygen supply system so that oxygen flows through the core duct only in the second operating mode of the rocket propulsion system.

* * * * *